Oct. 20, 1936. J. JAMES 2,058,317
HORSE COLLAR
Original Filed Dec. 7, 1934

Inventor
John James
By Miller & Miller
Attorneys

Patented Oct. 20, 1936

2,058,317

UNITED STATES PATENT OFFICE 2,058,317

HORSE COLLAR

John James, Lynnville, Ind.

Refiled for abandoned application Serial No. 756,554, December 7, 1934. This application June 15, 1936, Serial No. 85,417

3 Claims. (Cl. 54—19)

This invention relates to a horse collar and has for an object to provide an improved horse collar which will allow the horse to put his full weight against the collar when drawing loads and to eliminate more pain from the shoulders of the horse when so doing.

Horse collars, as now generally made, are stuffed with hay or straw, or possibly, in the more expensive ones, with hair. While new, such collars may retain their shape for a while, but as soon as they are put into general service, the stuffing material generally tends to collect in lumps and the lumps are usually located at such positions that they exert pressure against the muscles of the horse and at the same time afford no padding enabling the pulling force to be properly distributed. Obviously, when the stuffing becomes lumped in this manner, it causes strain to the horse and makes it impossible for the horse to pull the load with the same ease.

With this invention, the usual type of stuffing is eliminated and instead a molded stuffing consisting principally of sponge rubber and a reinforcing means of hard or semi-hard rubber takes the place of this previous inferior stuffing. Stuffing of this nature according to this invention does not gather in lumps when in use but instead remains properly distributed, making the work easier for the horse and allowing the horse, therefore, to pull heavier loads with greater facility.

This application is refiled for abandoned application, Serial No. 756,554, which was filed December 7, 1934.

With the foregoing and other objects in view, as will hereinafter become apparent, this invention comprises the constructions, combinations and arrangements of parts hereinafter set forth, claimed and illustrated in the accompanying drawing.

Figure 1:
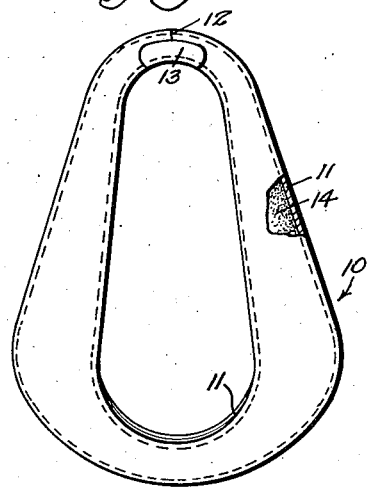
Figure 1 is a front elevation of the invention.
Figure 2:
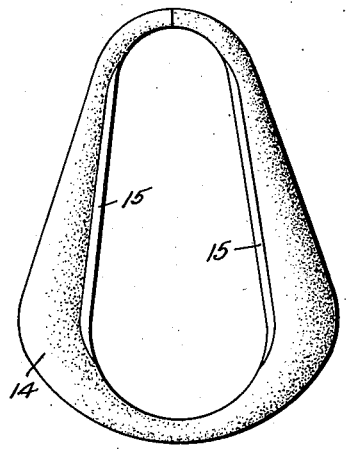
Fig. 2 is a front elevational view of the sponge rubber core and hard rubber supports.
Figure 3:
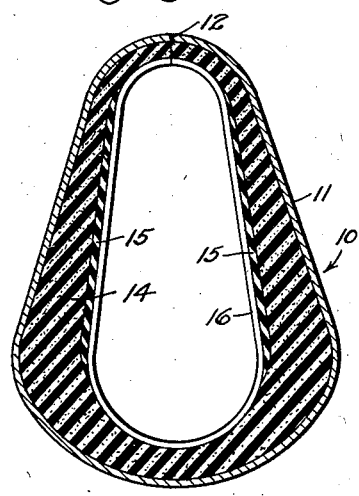
Fig. 3 is a vertical sectional view of the horse collar.
Figure 4:
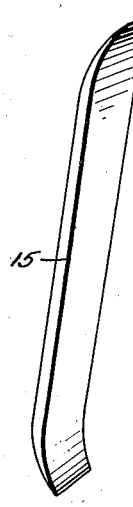
Fig. 4 is a perspective view of one of the supports.

There is shown at 10 the horse collar embodying this invention, this horse collar 10 being formed in the usual shape and used in the usual manner. As usual, the horse collar 10 has a leather covering 11 ending in the joint 12, which joint 12 is more firmly secured by means of the usual leather patch 13. In the ordinary collar, this leather covering or casing 11 is usually filled with stuffing, such as straw or hay. In the improved form of horse collar constituting this invention, the stuffing consists of a molded core 14 of soft sponge rubber material. To assist the collar 10 in retaining its proper shape, braces 15, preferably of hard or partially semi-hard rubber, are secured along the inner side of the core 14, as shown in Fig. 2 and Fig. 3. The braces 15 may be secured to the core 14 in any suitable manner, such as by a suitable rubber cement, or even, if desired, by vulcanizing the attachments therebetween.

After the core 14 has been properly molded of soft sponge rubber and the braces 15 secured in position thereon, the leather casing 11 is placed thereabout and simply stitched along the inner seam 16 and the joint 12, and the joint patch 13 is placed in position, thus completing the assembly of the collar and making it ready for use in the usual manner.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

1. A horse collar comprising a leather casing, a molded sponge rubber core within said leather casing, and a pair of brace members reinforcing said core, said braces being located along the opposite inner sides of said collar.

2. A horse collar comprising a leather casing, a sponge rubber molded core within said casing, and a pair of hard rubber brace members, each of said brace members being secured to the inner side of said molded core.

3. In a horse collar, a molded core of sponge rubber and a pair of hard rubber brace members secured to said molded core and holding the same in position.

JOHN JAMES.